United States Patent
Cieslar et al.

(10) Patent No.: US 11,768,286 B2
(45) Date of Patent: *Sep. 26, 2023

(54) METHOD OF DETERMINING THE YAW RATE OF A TARGET VEHICLE

(71) Applicant: Aptiv Technologies Limited, St. Michael (BB)

(72) Inventors: Dariusz Cieslar, Cracow (PL); Mateusz Stachnik, Gdów (PL); Krzysztof Kogut, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,671

(22) Filed: Jan. 25, 2023

(65) Prior Publication Data

US 2023/0168358 A1 Jun. 1, 2023

Related U.S. Application Data

(63) Continuation of application No. 16/004,487, filed on Jun. 11, 2018, now Pat. No. 11,592,545.

(30) Foreign Application Priority Data

Jun. 12, 2017 (EP) .................................. 17175548

(51) Int. Cl.
*G01S 13/42* (2006.01)
*G01S 13/931* (2020.01)
(Continued)

(52) U.S. Cl.
CPC ............ *G01S 13/42* (2013.01); *B60W 40/114* (2013.01); *G01S 13/582* (2013.01); *G01S 13/584* (2013.01);
(Continued)

(58) Field of Classification Search
CPC ...... G01S 13/931; G01S 13/42; G01S 13/584; G01S 13/582; G01S 2013/932;
(Continued)

(56) References Cited

U.S. PATENT DOCUMENTS 6,202,027 B1 3/2001 Alland et al.
9,043,132 B2 5/2015 Obi
(Continued)

FOREIGN PATENT DOCUMENTS

CN 103183028 A 7/2013
CN 104290752 A 1/2015
(Continued)

OTHER PUBLICATIONS

"Extended European Search Report", EP Application No. 17175548.1, dated Dec. 15, 2017, 9 pages.
(Continued)

*Primary Examiner* — Matthew M Barker
(74) *Attorney, Agent, or Firm* — Sawtooth Patent Group PLLC (57) ABSTRACT

This disclosure describes a radar system configured to estimate a yaw-rate and an over-the-ground (OTG) velocity of extended targets in real-time based on raw radar detections. This disclosure further describes techniques for determining instantaneous values of lateral velocity, longitudinal velocity, and yaw rate of points of a rigid body in a radar field-of-view (FOV) of the radar system.

20 Claims, 7 Drawing Sheets

(51) Int. Cl.
*B60W 40/114* (2012.01)
*G01S 13/58* (2006.01)
*G01S 7/295* (2006.01)

(52) U.S. Cl.
CPC ........ *G01S 13/931* (2013.01); *B60W 2520/14* (2013.01); *G01S 7/295* (2013.01); *G01S 13/589* (2013.01); *G01S 2013/932* (2020.01)

(58) Field of Classification Search
CPC .... G01S 7/295; G01S 13/589; B60W 40/114; B60W 2520/14
See application file for complete search history.

(56) References Cited

U.S. PATENT DOCUMENTS

| | | | |
|---|---|---|---|
| 9,187,091 | B2 | 11/2015 | Mills |
| 9,390,624 | B2 | 7/2016 | Minemura et al. |
| 9,983,301 | B2 | 5/2018 | Liu et al. |
| 10,114,106 | B2 | 10/2018 | Schiffmann et al. |
| 10,634,766 | B2 | 4/2020 | Stachnik et al. |
| 11,125,872 | B2 | 9/2021 | Stachnik et al. |
| 11,156,712 | B2 | 10/2021 | Alenljung et al. |
| 2005/0075788 | A1 | 4/2005 | Smith et al. |
| 2005/0216146 | A1 | 9/2005 | Bauer et al. |
| 2011/0068970 | A1 | 3/2011 | Mitsumoto |
| 2011/0122014 | A1 | 5/2011 | Szajnowski |
| 2012/0242530 | A1 | 9/2012 | Uebbert et al. |
| 2013/0030686 | A1 | 1/2013 | Morotomi et al. |
| 2015/0054676 | A1 | 2/2015 | Vinski et al. |
| 2016/0202346 | A1 | 7/2016 | Anderson et al. |
| 2017/0206436 | A1 | 7/2017 | Schiffmann |
| 2017/0363727 | A1 | 12/2017 | Prasad et al. |
| 2017/0363728 | A1 | 12/2017 | Prasad et al. |
| 2018/0024228 | A1 | 1/2018 | Schiffmann et al. |
| 2018/0356498 | A1 | 12/2018 | Stachnik et al. |
| 2019/0004166 | A1 | 1/2019 | Orlowski et al. |
| 2019/0361106 | A1 | 11/2019 | Stachnik et al. |
| 2019/0361113 | A1 | 11/2019 | Ray |
| 2019/0369228 | A1 | 12/2019 | Stachnik et al. |
| 2020/0057090 | A1 | 2/2020 | Stachnik et al. |
| 2020/0182992 | A1 | 6/2020 | Kellner et al. |

FOREIGN PATENT DOCUMENTS

| | | |
|---|---|---|
| CN | 105842684 A | 8/2016 |
| CN | 106372278 A | 2/2017 |
| CN | 107209264 A | 9/2017 |
| DE | 102013011239 A1 | 1/2015 |
| DE | 102013018310 A1 | 4/2015 |
| DE | 102013019804 A1 | 5/2015 |
| EP | 2307908 B1 | 1/2012 |
| EP | 3285230 A1 | 2/2018 |
| GB | 2504376 A | 1/2014 |
| JP | 2015111332 A | 6/2015 |
| KR | 20080007780 A | 1/2008 |

OTHER PUBLICATIONS

"Extended European Search Report", EP Application No. 18175505.9, dated Nov. 27, 2018, 8 pages.
"Foreign Office Action", CN Application No. 201810586972.1, dated Jun. 11, 2021, 8 pages.
"Foreign Office Action", CN Application No. 201810586972.1, dated Sep. 3, 2021, 4 pages.
"Foreign Office Action", CN Application No. 201810586972.1, dated Nov. 4, 2020, 14 pages.
"Foreign Office Action", CN Application No. 201910747166.2, dated Jun. 9, 2021, 13 pages.
"Foreign Office Action", EP Application No. 17175548.1, dated Jun. 7, 2021, 6 pages.
"Foreign Office Action", EP Application No. 17175548.1, dated Jun. 8, 2022, 4 pages.
"Non-Final Office Action", U.S. Appl. No. 16/386,691, filed Apr. 16, 2021, 12 pages.
"Non-Final Office Action", U.S. Appl. No. 16/409,019, filed Feb. 16, 2021, 20 pages.
"Notice of Allowance", U.S. Appl. No. 16/409,019, filed Jun. 7, 2021, 10 pages.
"Notice of Allowance", U.S. Appl. No. 16/386,691, filed Aug. 20, 2021, 7 pages.
Brobeit, et al., "Fusion of Doppler Radar and Geometric Attributes for Motion Estimation of Extended Objects", Oct. 2015, 5 pages.
Fischler, et al., "Random Sample Consensus: A Paradigm for Model Fitting with Applications to Image Analysis and Automated Cartography", Jun. 1981, pp. 381-395, 15 pages.
Jung, et al., "Rectangle Detection Based on a Windowed Hough Transform", Jan. 2004, 8 pages.
Jung, et al., "Scanning Laser Radar-Based Target Position Designation for Parking Aid System", Sep. 2008, pp. 406-424, 19 pages.
Kellner, et al., "Instantaneous Full-Motion Estimation of Arbitrary Objects using Dual Doppler Radar", Jun. 8, 2014, pp. 324-329.
Kellner, et al., "Instantaneous Lateral Velocity Estimation of a Vehicle using Doppler Radar", Jul. 2013, 9 pages.
Kellner, et al., "Tracking of Extended Objects with High-Resolution Doppler Radar", May 1, 2016, pp. 1341-1353.
Kmiotek, et al., "Representing and Tracking of Dynamics Objects Using Oriented Bounding Box and Extended Kalman Filter", Oct. 2008, pp. 322-328, 7 pages.
Roos, et al., "Estimation of the Orientation of Vehicles in High-Resolution Radar Images", Apr. 2015, 4 pages.
Roos, et al., "Estimation of the Orientation of Vehicles in High-Resolution Radar Images", Apr. 27, 2015, pp. 1-4.
Roos, et al., "Reliable Orientation Estimation of Vehicles in High-Resolution Radar Images", Jul. 2016, 9 pages.
Toussaint, "Solving Geometric Problems with the Rotating Calipers", May 1983, 8 pages.

METHOD OF DETERMINING THE YAW RATE OF A TARGET VEHICLE

CROSS-REFERENCE TO RELATED APPLICATIONS

This application is a continuation of U.S. patent application Ser. No. 16/004,487, filed Jun. 11, 2018, which claims priority to European Patent Application No. 17175548.1, filed Jun. 12, 2017, the disclosures of which are hereby incorporated by reference in their entireties herein.

TECHNICAL FIELD OF INVENTION

This disclosure generally relates to a radar system suitable for an automated vehicle, and more particularly relates to a system that calculates a yaw-rate of the target. This invention relates to a vehicle on-board method of estimation of planar motion parameters of objects (targets such as another vehicle) detected by a (e.g. Doppler) radar. It has particular application to detected the planar motion parameters of a vehicle by a host vehicle equipped with a radar system.

BACKGROUND OF INVENTION

Aspects of the invention relate to an improved method of determining the instantaneous values of lateral velocity, longitudinal velocity and yaw rate of any point of a rigid body in the radar field-of-view (FOV). Aspects are applicable (but not limited) to the estimation of vehicles for automotive perception systems and can be used in Active Safety, Driver Assistance and Autonomous Driving applications.

When an automated or autonomous host-vehicle is preceded by a target-vehicle traveling forward of the host-vehicle, it is advantageous for the system that controls the operation (e.g. steering, brakes, engine) of the host-vehicle to have knowledge of the yaw-rate of the target vehicle. Knowledge of the yaw-rate of the target vehicle can be useful to, for example, temporarily allow a closer following distance because the target-vehicle is turning out of the travel path of the host-vehicle.

In prior art, no algorithm was reported for an instantaneous estimation of full planar motion of rigid body target objects based on raw detections of a single radar.

SUMMARY OF THE INVENTION

In one aspect is provided a method of determining the yaw rate ($\hat{\omega}_t$) of a target vehicle in a horizontal plane by a host vehicle equipped with a radar system, said radar system including a radar sensor unit adapted to receive signals emitted from said host vehicle by said target, comprising: emitting a radar signal at a single time-point instance and determining from a plurality (m) of point radar detections measurements captured from said target vehicle by said radar sensor unit in said single radar measurement instance, the values for each point detection of range, azimuth and range rate; $[r_i, \theta_i, \dot{r}_i]$; determining the values of the longitudinal and lateral components of the range rate equation of the target ($c_t, s_t$) from the results ($\dot{r}_i, \theta_i,$) of step a); where the range rate equation is $$\dot{r}_{i,cmp} = [\cos\theta_i \; \sin\theta_i]\begin{bmatrix} c_t \\ s_t \end{bmatrix},$$

where $\dot{r}_{i,cmp} = \dot{r}_i + u_s \cos\theta_i + v_s \sin\theta_i$ where $u_s$ is the sensor unit or host vehicle longitudinal velocity and $v_s$ is the sensor unit or host vehicle lateral velocity; determining the orientation angle of the target ($\gamma_{t,scs}$); d) determining the target center ($x_t$ and $y_t$) from the results ($r_i, \theta_i$) of step a); e) determining a line $1_{PH}$ perpendicular to the orientation of the target and passing through the center of the target ($x_{t,c,scs}, y_{t,c,scs}$) from the results of step (c) and (d); f) determining a line $1_{CA}$ passing through the center of rotation of said target and the position of radar sensor unit of said vehicle; from the steps of b); g) determining the intersection point of the lines $1_{CA}$ and $1_{PH}$ from steps e) and f) being the position of the center of rotation $[\hat{x}_{t,COR}, \hat{y}_{t,COR}]$ of the target; and h) estimating and yaw rate $\hat{\omega}_t$ from the position of the center of rotation found in step g) and components of range rate equation of the target ($c_t$ or $s_t$) of step b).

Step c) may comprise determining the orientation angle of the target ($\gamma_{t,scs}$); from the values of range and azimuth ($r_i, \theta_i,$) of said point detections.

Step c) may comprise determining the orientation angle of the target ($\gamma_{t,scs}$); from L fit, Hough transform or rotating caliper methodology from the results of step a).

Step b) may include estimating components of range rate equation of the target ($c_t$, $s_t$) said point detection measurements of azimuth and range rate $[\theta_i, \dot{r}_i]$.

Said estimating may comprise applying a Least Square method.

Said line $1_{PH}$ of step e) may be determined and defined from the following equation:

$$y = -\frac{1}{\tan\gamma_{t,scs}}x + \frac{1}{\tan\gamma_{t,scs}}x_{t,c,scs} + y_{t,c,scs} = a_1 x + a_0.$$

Said line $1_{CA}$ of step f) may be determined and defined from the following equation:

$$y = -\frac{\overline{s}_{t,scs}}{\overline{c}_{t,scs}}x = b_1 x + b_0.$$

In step g) the position of the center of rotation $[\hat{x}_{t,COR}, \hat{y}_{t,COR}]$ of the target may be determined from the following equations:

$$\hat{x}_{t,COR,scs} = \frac{b_0 - a_0}{a_1 - b_1} \text{ and, } \hat{y}_{t,COR,scs} = \frac{a_1 b_0 - a_0 b_1}{a_1 - b_1}.$$

In step h) the yaw rate may be determined from the following equations:

$$\hat{\omega}_t = \frac{\overline{s}_{t,scs}}{-\hat{x}_{t,COR,scs}} \text{ or } \hat{\omega}_t = \frac{\overline{c}_{t,scs}}{\hat{y}_{t,COR,scs}}.$$

The method may include additionally determining estimates of longitudinal velocity $\hat{u}_{t,i}$, lateral velocity $\hat{v}_{t,i}$ of certain target point from the value of yaw rate and the coordinates of the center of rotation of the target ($y_{t,COR,wcs}, x_{t,COR,wcs}$) using the following equation:

$$\begin{bmatrix} \hat{u}_{t,i,scs} \\ \hat{v}_{t,i,scs} \end{bmatrix} = \begin{bmatrix} (\hat{y}_{t,COR,scs} - y_{t,i,scs})\hat{\omega}_t \\ (x_{t,i,scs} - \hat{x}_{t,COR,scs})\hat{\omega}_t \end{bmatrix}.$$

BRIEF DESCRIPTION OF DRAWINGS

The present invention is now described by way of example with reference to the accompanying drawings in which:

FIGS. 9$a$ to $d$ illustrate the movement relating to FIG. 8;
FIG. 11$a$ to $d$ illustrate the movement relating to FIG. 10;
FIGS. 13$a$ to $d$ illustrate the movement relating to FIG. 12.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Accurate estimation of the yaw-rate and over-the-ground (OTG) velocity is important for many driving-assistance systems. Described herein is a radar system configured to estimate the yaw-rate and OTG velocity of extended targets (largely, for vehicle tracking) in real-time based on raw radar detections (i.e., range, range-rate, and azimuth). As used herein, the term 'extended-targets' is used to refer to targets that present multiple, spaced-apart scattering-points so the term 'extended-target' is understood to mean that the target has some physical size. The various scattering-points are not necessarily individually tracked from one radar scan to the next, so the number of scatter-points can be a different quantity and/or each scattering point have a different location on the extended-target in successive radar scans.

The invention determines instantaneous values of lateral velocity, longitudinal velocity and yaw rate of any point of a rigid body (such as another vehicle) in the radar field-of-view (FOV). Generally, a host vehicle is equipped with a radar system where reflected radar signals (detection) from another vehicle in the field of view are processed to provide data in order to ascertain these parameters. In order to do this various conditions and requirements are needed. The target (rigid body/vehicle) needs to be a distributed target, i.e. provide a plurality of detections from the same target.

Also assumed is an approximation of the distributed target by a rigid body model which is e.g. appropriate for vehicles (passenger cars, trucks, motorbikes, trains, trams, etc.), though not generally applicable to vulnerable road users.

Radar detections received by the host vehicle form the target provide raw data provide data with respect to the position of the radar transmit/receive element/unit e.g. the Cartesian position of the detections or the Polar coordinates (azimuth angle, range). By using e.g. Doppler techniques, the range rate can also be determined.

In the subsequent concept description, the following conventions and definitions are used:

World Coordinate System

Figure 1:
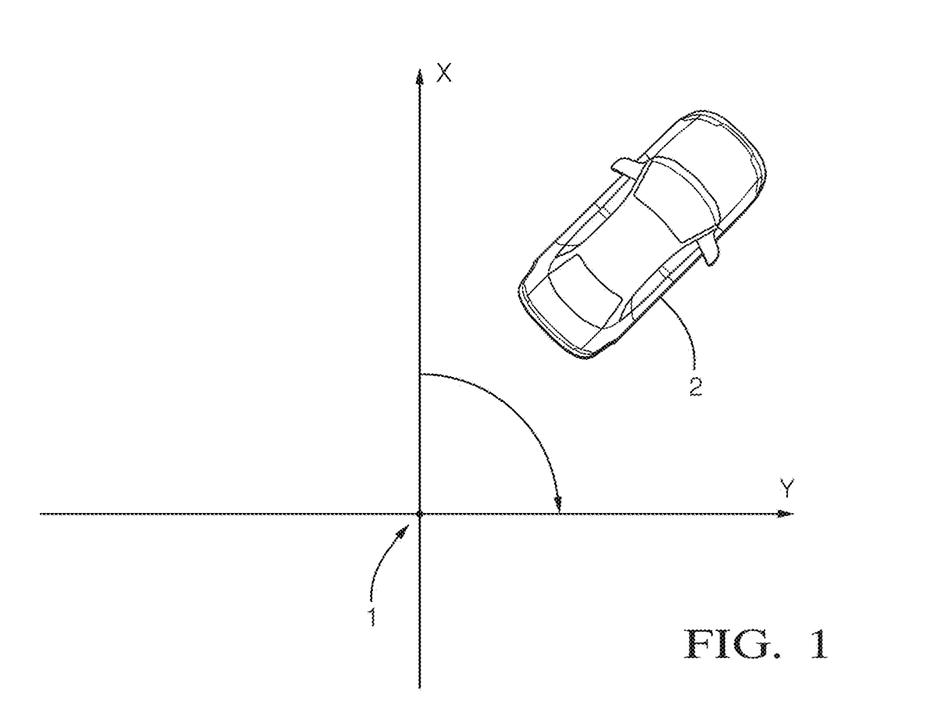
FIG. 1 shows a target co-ordinate system.

As is convention an inertial coordinate system with the origin fixed to a point in space is used—it is assumed the co-ordinate system does not move and does not rotate. Conventionally the coordinate system is right-handed; the Y-axis orthogonal to the X-axis, pointing to the right; the Z-axis pointing into the page and positive rotation is to the right of the X-axis; see FIG. 1 which shows such a co-ordinate system with origin 1 and a non-ego vehicle (target) 2.

Vehicle Coordinate System

Figure 2:
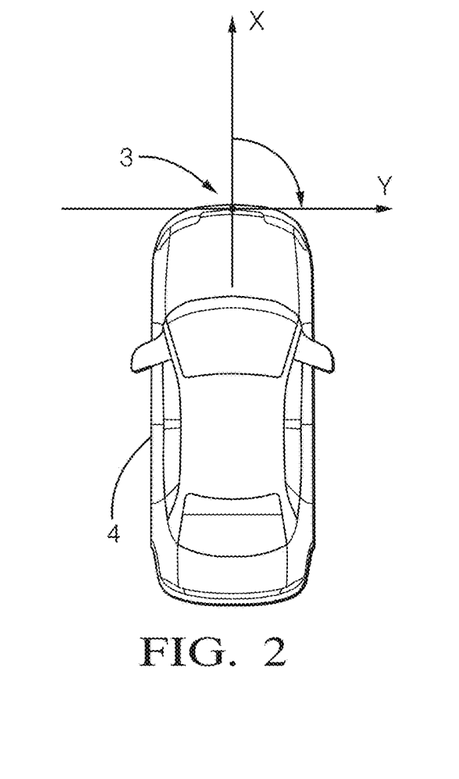
FIG. 2 shows a vehicle coordinate system.

The origin may be located at the center of the front bumper 3 of the host vehicle 4 as shown by FIG. 2. The X-axis is parallel to the longitudinal axis of the vehicle. The coordinate system is right-handed with the Y-axis orthogonal to the X-axis, pointing to the right, the Z-axis pointing into the page and positive rotation to the right of the X-axis

Sensor Coordinate System

Figure 3:
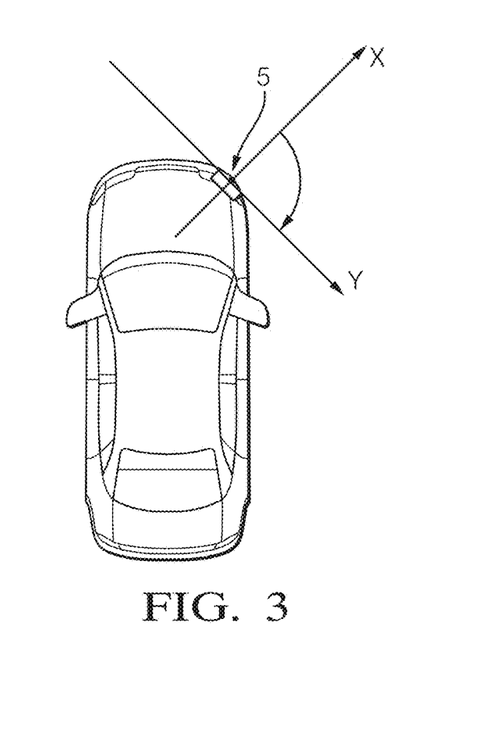
FIG. 3 shows a sensor coordinate system.

Origin located at the center of the sensor unit/radome. The X-axis is perpendicular to the sensor radome, pointing away from the radome. The coordinate system is right-handed: Y-axis orthogonal to the X-axis, pointing to the right; Z-axis pointing into the page; Positive rotation to the right of the X-axis. FIG. 3 shows a sensor origin 5.

In aspects of the invention and with prior art techniques, the velocity and the yaw rate of the host vehicle is assumed known. The host over the ground (OTG) velocity vector is defined as:

$$V_h = [u_h v_h]^T,$$

where $u_h$—host longitudinal velocity and $v_h$—host lateral velocity.

Sensor mounting position and boresight angle in the vehicle coordinate system are also assumed known; the following notations are used: $x_{s,VCS}$—sensor mounting position, longitudinal coordinate; $y_{s,VCS}$—sensor mounting position, lateral coordinate; and $\gamma_{s,VCS}$—sensor boresight angle.

The sensor(s) Over the Ground (OTG) velocities are assumed known (determined from host vehicle motion and sensor mounting positions). Sensor velocity vector is defined as $V_s = [u_s \ v_s]^T$ with $u_s$—sensor longitudinal velocity and $v_s$—sensor lateral velocity. At each radar measurement instance, the radar unit/sensor captures m raw detections from the target. Each raw detection is described by the following parameters expressed in the sensor coordinate system: $r_i$—range (or radial distance), $\theta_i$—azimuth angle, and $\dot{r}_i$—raw range rate (or radial velocity) i=1, ..., m.

Target planar motion is described by the Target over-the-ground velocity vector at the location of each raw detection: $V_{t,i} = [u_{t,i} \ v_{t,i}]^T$, where: $u_{t,i}$—longitudinal velocity at the location of i-th raw detection, and $v_{t,i}$—lateral velocity at the location of i-th raw detection.

Figure 4:
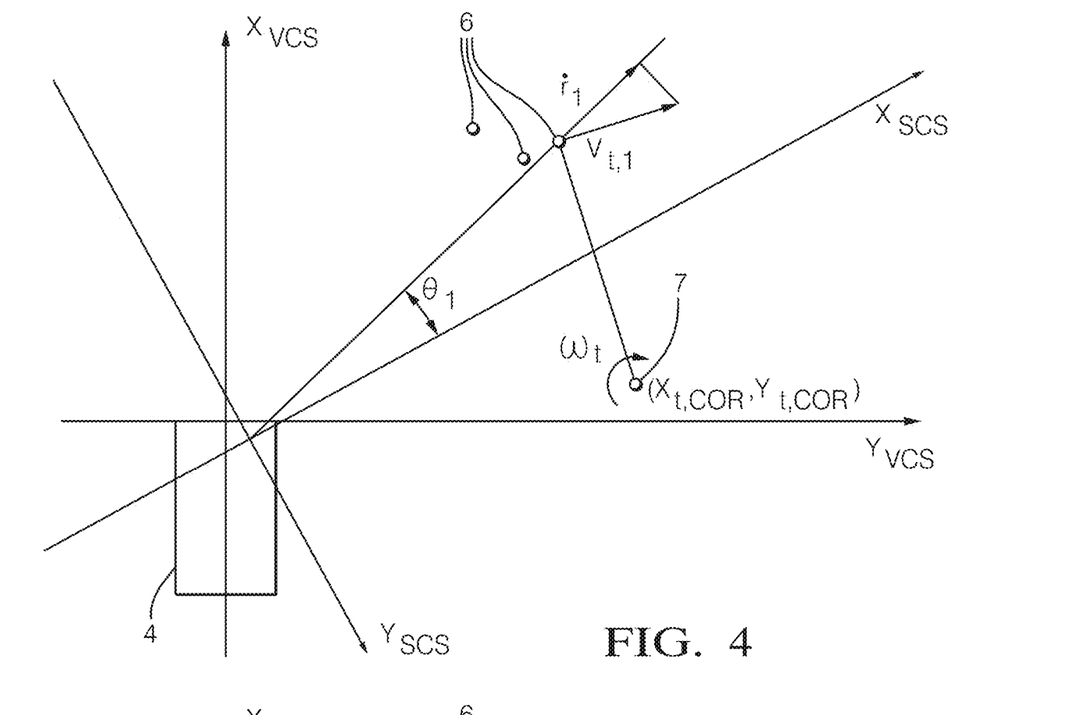
FIG. 4 illustrates how to calculate velocity vectors at the locations of three raw detections.

Target planar motion can be described as well by: $V_{t,COR} = [\omega_t \ x_{t,COR} \ y_{t,COR}]^T$ where $\omega_t$—target yaw rate, $x_{t,COR}$—longitudinal coordinate of the center of target's rotation, $y_{t,COR}$—lateral coordinate of the center of target's rotation, $x_{t,c}$—longitudinal coordinate of the center of target's bounding box, $y_{t,c}$—lateral coordinate of the center of target's bounding box, and $\gamma_t$—orientation of the target object FIG. 4 illustrates how to calculate velocity vectors at the locations of three raw detections (depicted by reference numeral 6) captured from the same rigid body target and the yaw rate of that target. Center of the target's rotation depicted with reference numeral 7. The range rate equation for a single raw detection is given as follows: $\dot{r}_i + u_s \cos\theta_i + v_s \sin\theta_i = u_{t,i} \cos\theta_i + v_{t,i} \sin\theta_i$.

To simplify the notation, the notion of a compensated range rate is introduced and defined as: $\dot{r}_{i,cmp} = \dot{r}_i + u_s \cos\theta_i + v_s \sin\theta_i$, with $\dot{r}_{i,cmp}$—range rate compensated of i-th raw detection.

Then the equation is reduced to: $\dot{r}_{i,cmp} = u_{t,i} \cos\theta_i + v_{t,i} \sin\theta_i$.

Range rate equation in vector form $$\dot{r}_{i,cmp} = [\cos\theta_i \ \sin\theta_i] \begin{bmatrix} u_{t,i} \\ v_{t,i} \end{bmatrix}.$$

Range rate equation in general vector form $$\dot{r}_{i,cmp} = [\cos\theta_i \ \sin\theta_i] \begin{bmatrix} c_t \\ s_t \end{bmatrix},$$

with: $c_t$—longitudinal range rate equation solution, and $s_t$—lateral range rate equation solution.

Velocity profile is used as range rate equation solution synonym. Note estimated values are denoted with a hat and Least Square solutions are denoted with a tilde.

Problem Formulation

The problem to be solved can be phrased as follows: estimate velocity vectors $\hat{V}_{t,i}$ and yaw rate $\hat{\omega}_t$ using raw detection measurements $[r_i, \theta_i, \dot{r}_i]$ captured from a rigid body target in a single radar measurement instance. Since the locations of the three raw detections are known (by means of direct measurements and sensor mounting position), the equivalent problem formulation is: estimate the position of the center of rotation $[\hat{x}_{t,COR}, \hat{y}_{t,COR}]$ and yaw rate $\hat{\omega}_t$ using raw detection measurements $[r_i, \theta_i, \dot{r}_i]$ captured from a rigid body target in a single radar measurement instance.

Cloud Algorithm

Previously the case of a straight-line moving distributed target was considered. This restriction simplifies the estimation problem as the velocity vectors at the location of each raw detections are identical, i.e.: $V_{t,i} = [u_{t,i} \ v_{t,i}]^T = [u_t \ v_t]^T = V_t$, for i=1, ..., m.

The Cloud Algorithm (CA) was proposed to estimate over-the-ground lateral $v_t$ and longitudinal $u_t$ velocity of the "cloud" of detections coming from the same target. This was achieved by Least Square solution to the problem defined as follows:

$$\dot{r}_{i,} = [\cos\theta_i \ \sin\theta_i] \begin{bmatrix} u_t \\ v_t \end{bmatrix}.$$

The algorithm proved to be a very effective technique for instantaneous estimation of target velocity. Additionally, under the additional assumption of a negligible sideslip, the angle $\hat{\gamma}_t = \tan^{-1}(\tilde{v}_t/\tilde{u}_t)$ can be used as an estimate of the targets heading.

In D. Kellner, M. Barjenbruch, K. Dietmayer, J. Klappstein, and J. Dickmann, "Instantaneous lateral velocity estimation of a vehicle using Doppler radar," in Proceedings of 16th International Conference on Information Fusion, Istanbul, Turkey, 2013. The same problem and the same theoretical basis for the estimation of lateral velocity of a straight line moving object was considered. Enhancement to the Cloud Algorithm was made by means of executing RANSAC algorithm to identify outliers and executing orthogonal distance regression (ODR) to solve error-in-variables problem for the modified formulation of the original problem. This approach improved robustness of the solution in comparison to the original Cloud Algorithm solution. Computational complexity and the requirement to solve an optimization problem are the major drawbacks of the proposed approach, especially when an application in a production embedded system is to be considered.

Cloud Algorithm Solution for Yawing Targets

Previously the application of the cloud algorithm to the estimation of target's motion without the restriction on straight-line path was investigated. Such situation is shown in FIG. 4. The over-the-ground velocity vectors at the location of each detection are determined as follows:

$$\begin{bmatrix} u_{t,i,wcs} \\ v_{t,i,wcs} \end{bmatrix} = \begin{bmatrix} (\hat{y}_{t,COR,wcs} - y_{t,i,wcs})\omega_t \\ (x_{t,i,wcs} - \hat{x}_{t,COR,wcs})\omega_t \end{bmatrix}.$$

The range rate equation for each raw detection was derived to be: $\dot{r}_{t,cmp}=(t_{t,COR,wcs}-y_{s,wcs})\omega_t \cos \theta_i + (x_{s,wcs}-x_{t,COR,wcs})\omega_t \sin \theta_i$.

Figure 5:
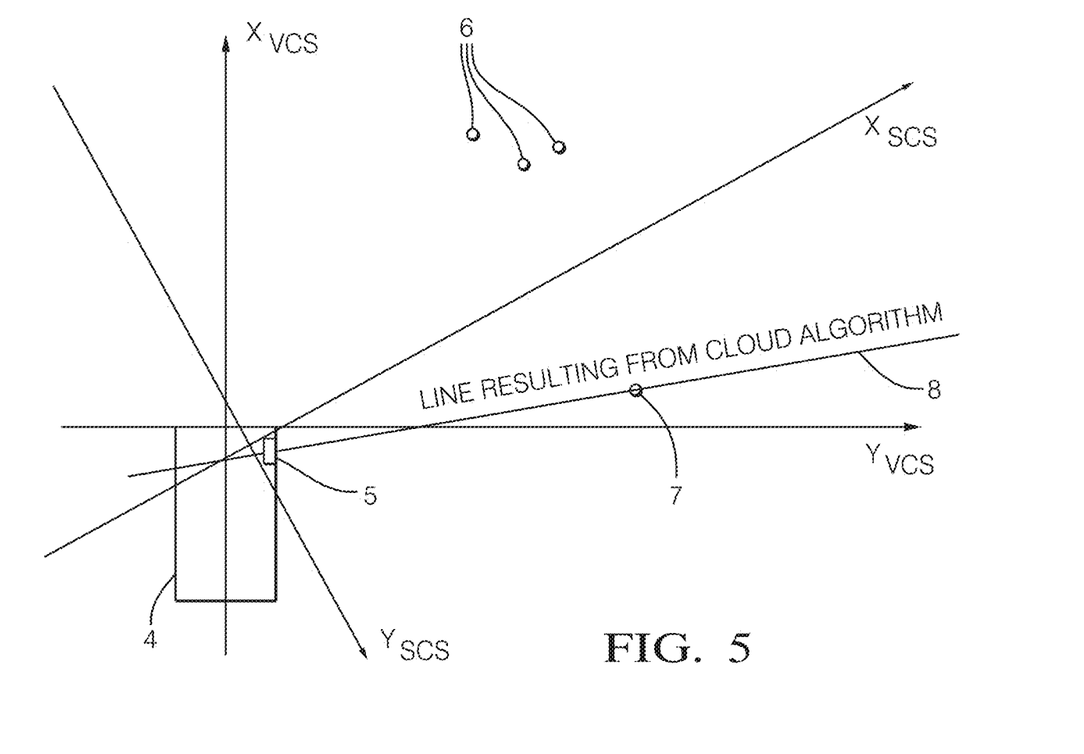
FIG. 5 which shows the result of the cloud algorithm for yawing targets.

It was then shown that the Least Square solution to this problem results in: $\tilde{u}_t=(y_{t,COR,wcs}-y_{s,wcs})\omega_t$, and $\tilde{v}_t=(x_{s,wcs}-x_{t,COR,wcs})\omega_t$. One therefore achieves: $\tilde{u}_t(x_{s,wcs}-x_{t,COR,wcs})=\tilde{v}_t(y_{t,COR,wcs}-y_{s,wcs})$ This is a result of a major importance. One can conclude (conclusion 1) that by considering range rates and azimuths from a cloud of detections coming from the same rigid body target and captured in a single look of a single radar, it is possible to estimate the position of the center of rotation and the yaw rate. Further (conclusion 2) it is possible to determine the line at which the center of rotation lies. This line passes through the sensor. This is shown in FIG. 5 which shows the result of the Cloud Algorithm for yawing targets. Calculations based on the three raw detections denoted 6 results in the line (of the center of detection) 8 passing through the sensor and the center of rotation 7. The exact location of the center of rotation 7 not specified by Cloud Algorithms.

In the results highlighted above are followed by the proposition of estimating the full motion of the target using detections captured in multiple looks (instances) of a single radar. Such an estimation is possible under the assumption of a constant yaw rate during the time of these multiple looks. It is also necessary for the host vehicle to be moving. Geometrical interpretation of this method is that one needs to find a (stationary) point of intersection of two lines passing through the (moving) sensor in multiple time instances. Because angles of the two lines are likely to be very similar (the faster the host moves the greater the angle), the approach is prone to inaccuracies.

In D. Kellner, M. Barjenbruch, J. Klappstein, jurgen Dickmann, and K. Dietmayer, "Instantaneous full-motion estimation of arbitrary objects using dual doppler radar," in Proceedings of Intelligent Vehicles Symposium (IV), Dearborn, MI, USA, 2014, the same problem was considered and the solution to the Conclusion 1 was to take measurements from two sensors. The Conclusion 2 was not mentioned by the authors, but one supposes e that the lines passing through both sensors would intersect in the center of target's rotation. The authors then applied RANSAC and ODR techniques previously presented in order to improve the robustness of the solution.

The drawbacks of the solution proposed above include that the target needs to be in the field-of-view of multiple sensors (in automotive radar configurations, common parts of field-of-view of multiple radars are usually small). For good accuracy and robustness of the solution a significant distance between the two sensors is desired. The scope of such installation is significantly limited by the dimensions of the host vehicle. One either needs to assume constant yaw rate between the looks of two radars or to synchronize the measurement instance of both sensors. Additional data processing applied to make the solution more robust are characterized by significant computational complexity.

Yaw Cloud Algorithm

The concepts reviewed so far have not assumed any motion model of the target. An Extended Kalman Filter has been formulated based on a constant turn motion model and measurement model derived from a cloud algorithm. The algorithm is called YCA (Yaw Cloud Algorithm). In the proposed formulation measurements from a single radar are considered, but the possibility of extension to multiple sensors is also highlighted.

One object in the current invention in comparison to the above, is not to use time-filtering, and not assume any underlying motion model for the target. The approach does not suffer from difficulties associated with appropriate track initialization.

Object Orientation Estimation

Figure 6:
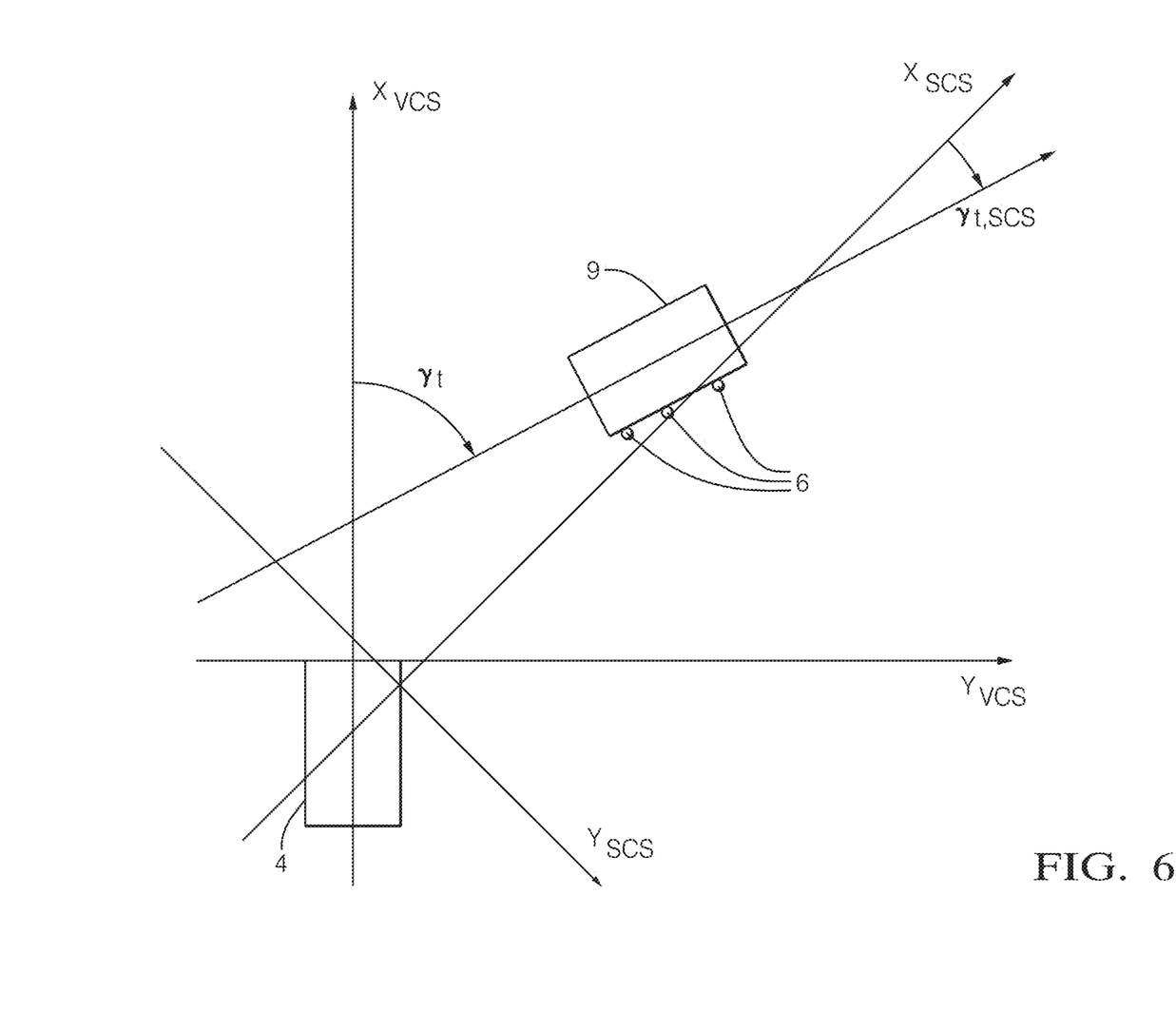
FIG. 6 shows an example of the determination of target orientation based on spatial distribution of raw detections.

Further prior art relevant to the current concept focuses on the estimation of target orientation based on high-resolution radar, laser scanner or LiDAR measurements. These algorithms ignore the range rate measurement and focus exclusively on the locations of raw detections. FIG. 6 shows an example of the determination of target 9 orientation based on spatial distribution of raw detections. Example with three detections denoted with dots 6.

Several algorithms were proposed for such applications. They can be grouped in three main categories: Rotating Calipers based approaches; L-fit; and the Hough transform. Additional modifications to the rotating calipers method were proposed. The accuracies reported for these algorithms based on the assessment of experimental results were about 10 degree RMS. The accuracies were shown to be dependent on the relative target orientation in SCS (sometimes called aspect angle or exposition angle). A further simplified approach suitable for real-time executions has already been implemented for Short Range Radars. The enhancement proposed in that implementation is to treat the orientation of the tracked object associated with a considered cloud as an initial guess for instantaneous orientation estimation. Next the adjustment of the orientation is performed using the distribution of detections captured only in the current look. This approach can be treated as an optional 'hot starting' of the instantaneous orientation estimation. The results are promising in particular when the target is close to the host and a sufficient number of raw detections is available. It is noted here that the determination of target orientation in prior art is not related to the estimation of target motion. Two branches of building blocks were identified: development of algorithms considering only azimuth and range rate measurements and development of algorithms considering only azimuth and range measurements

DESCRIPTION OF THE PREFERRED EMBODIMENTS

The invention includes provides instantaneous estimation of target planar motion from detections of a single radar look of e.g. a high resolution Doppler radar with the possibility of detecting that the target has a yaw rate above a certain threshold. It is to be noted that the "raw data" from this single radar look provides the parameters of $r_i$—range (or radial distance), $\theta_i$—azimuth angle, $\dot{r}_i$—raw range rate (or radial velocity) for each ith point of m point detections on a rigid body. These are the parameters which are used to determine the yaw rate as well as longitudinal and lateral velocities, where i=1, . . . , m. It is to be noted that the term instantaneous or single look radar data would include reflection data from a "chirp" in Doppler techniques which may scan over e.g. up to 2 ms. By this known methodology range rate may be determined.

Methodology according to aspects are based on the combination of the cloud algorithm and spatial (or geometry) based estimation of object heading. In this way all three radar measurements (i.e. range, azimuth and range rate) are exploited to overcome the previously known limitations.

For the sake of convenience, the earlier presented cloud algorithm for yawing targets is now expressed in sensor coordinate system. In an initial step, the method comprises emitting a radar signal at a single time-point instance and determining from a plurality (m) of point radar detections measurements therefrom captured from said radar sensor unit in a said single radar measurement instance the values for each point detection of range, azimuth and range rate; $[r_i, \theta_i, \dot{r}_i]$. In the next step, estimates of range rate equation parameters (of the target) obtained by the Least Square Solution to:

$$\dot{r}_{i,cmp} = [\cos\theta_i \; \sin\theta_i]\begin{bmatrix} c_t \\ s_t \end{bmatrix}.$$

Starting with the definition of over-the-ground velocity vectors at the location of each detection with longitudinal $u_{t,i,scs}$ and lateral velocities $v_{t,i,scs}$ aligned along sensor axes:

$$\begin{bmatrix} u_{t,i,scs} \\ v_{t,i,scs} \end{bmatrix} = \begin{bmatrix} (y_{t,COR,scs} - y_{t,i,scs})\hat{\omega}_t \\ (x_{t,i,scs} - x_{t,COR,scs})\hat{\omega}_t \end{bmatrix}.$$

The range rate equation becomes: $\dot{r}_{i,cmp} = (y_{t,COR,scs} - y_{t,i,scs})\omega_t \cos\theta_i + (x_{t,i,scs} - x_{t,COR,scs})\omega_t \sin\theta_i$.

Since: $y_{t,i,scs} \cos\theta_i = r_{t,i} \sin\theta_i \cos\theta_i = x_{t,i,scs} \sin\theta_i$ one can write: $\dot{r}_{i,cmp} = (y_{t,COR,scs})\omega_t \cos\theta_i + (-x_{t,COR,scs})\omega_t \sin\theta_i$. The Least Square solution to this problem is: $\tilde{c}_{t,scs} = y_{t,COR,scs}\omega_t$, $\tilde{s}_{t,scs} = -x_{t,COR,scs}\omega_t$, and $\tilde{c}_{t,scs}(y_{t,COR,scs}) = \tilde{s}_{t,scs}(-x_{t,COR,scs})$. It is to be noted that the range measurement is not used in velocity estimation.

In the next step the orientation angle of the target ($\gamma_{t,scs}$) must be computed. This may be estimated from raw detection data such as ($r_i, \theta_i$,) and may be estimated by L fit, Hough transform or rotating caliper methodology In the next step the line $l_{PH}$ perpendicular to the orientation of the target and passing through the center of the target ($x_{t,c,scs}, y_{t,c,scs}$) is determined by:

$$l_{PH}: y = -\frac{1}{\tan\gamma_{t,scs}}x + \frac{1}{\tan\gamma_{t,scs}}x_{t,c,scs} + y_{t,c,scs} = a_1 x + a_0.$$

In the next step, the line $l_{CA}$ (equivalent to reference numeral 7 of FIG. 5) passing through the center of rotation and sensor mounting position is determined by applying the cloud algorithm:

$$l_{CA}: y = -\frac{\tilde{s}_{t,scs}}{\tilde{c}_{t,scs}}x = b_1 x + b_0,$$

where $b_o$ can be zero—so the term may be removed in another form of the equation.

In a fourth step the intersection point of the lines from the previous two steps are determined with:

$$\hat{x}_{t,COR,scs} = \frac{b_0 - a_0}{a_1 - b_1}, \text{ and } \hat{y}_{t,COR,scs} = \frac{a_1 b_0 - a_0 b_1}{a_1 - b_1}.$$

It is to be noted that if both lines are parallel (i.e. $\alpha_1 = b_1$), then there is no solution and the yaw rate cannot be estimated. Additionally: if $\alpha_0 \neq b_0$: the lines are parallel, there is no intersection thus no yaw rate, the target is moving along a straight line and where $\alpha_0 = b_0$: the lines are identical and nothing can be said about the motion of the target.

In step 5 if both the orientation estimation and cloud algorithm return plausible results, the yaw rate of the target calculate is calculated as:

$$\hat{\omega}_t = \frac{\tilde{s}_{t,scs}}{-\hat{x}_{t,COR,scs}} \text{ or } \hat{\omega}_c = \frac{\tilde{c}_{t,scs}}{\hat{y}_{t,COR,scs}}.$$

Figure 7:
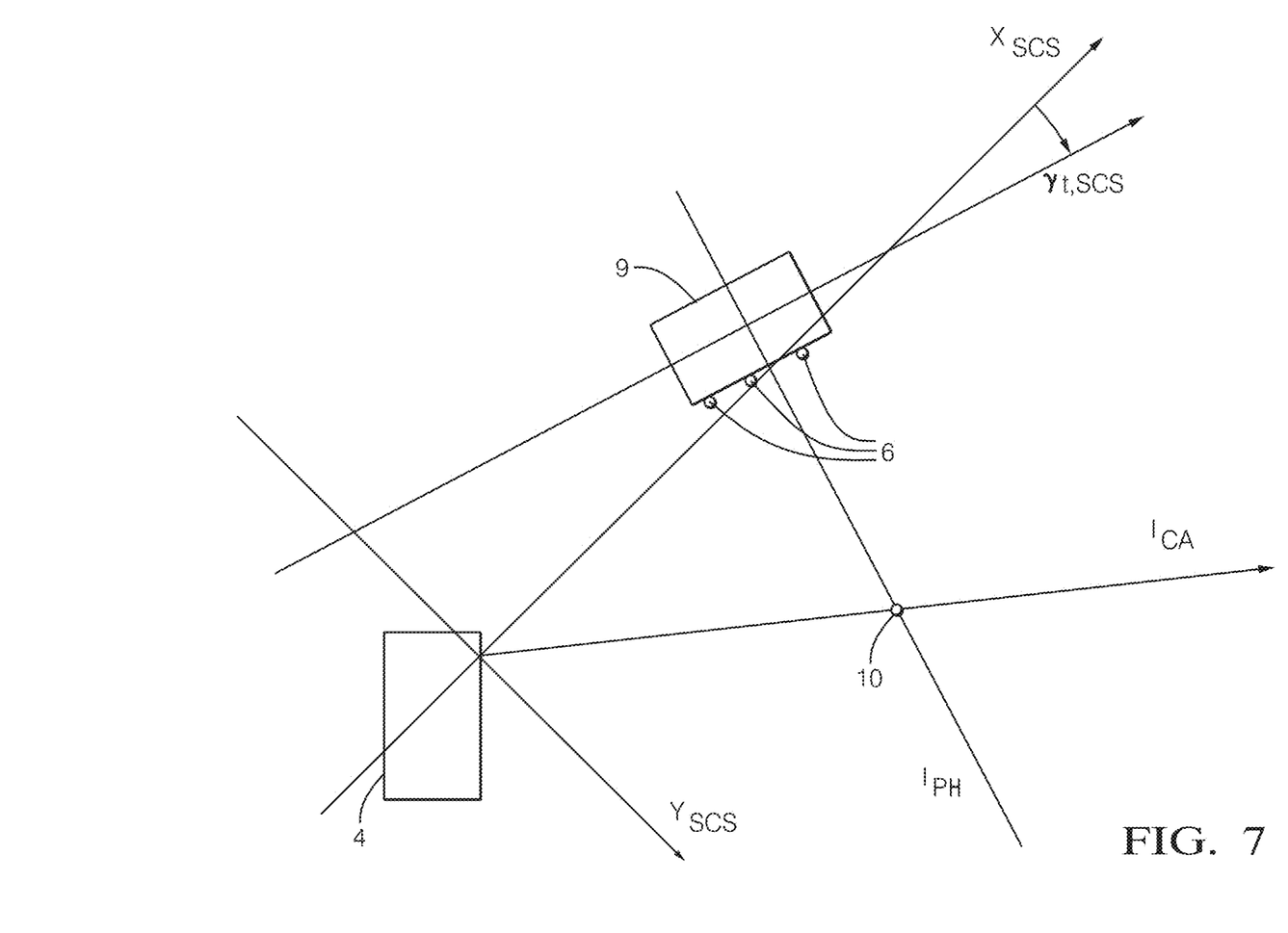
FIG. 7 illustrates a geometrical interpretation of one method.

It is to be noted that the estimated yaw rate depends on both the Least Square result for cloud algorithm as well as the position of COR. For example, for the same $\tilde{s}_{t,scs}$ yaw rate will be higher when the center of rotation is calculated to be near the host vehicle and will be lower when the $\hat{x}_{t,COR,scs}$ is further away from the host. FIG. 7 illustrates a geometrical interpretation of the method. Center of rotation estimated to be in the location of the dot 10.

Results

Results of estimating the yaw rate by the proposed technique was evaluated using experimental data. The experiments were collected for stationary host vehicle and a single target vehicle. Both vehicles were equipped with a differential GPS which accurately measures positions, velocities and yaw rates. In post-processing stage, all detections captured from the vicinity of the reference object were selected for calculating cloud algorithm. The orientation of the target was taken directly from reference data.

Figure 8:
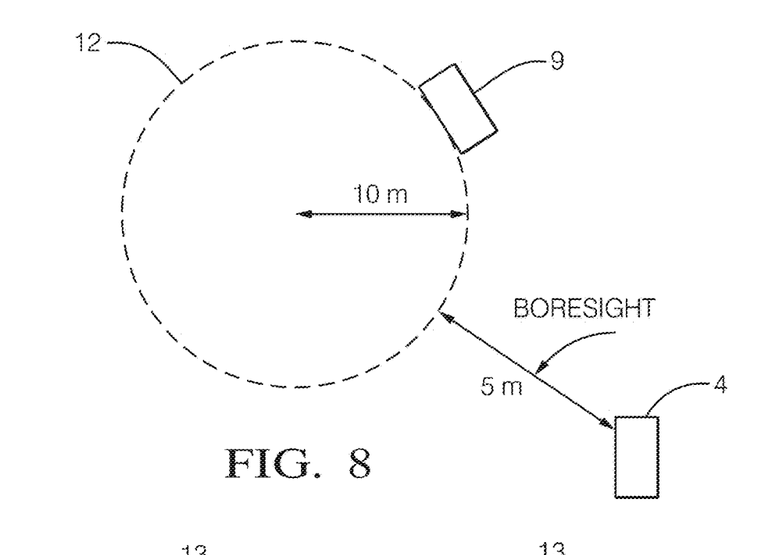
FIG. 8 shows an example of test results of a maneuver.
Figure 9A:
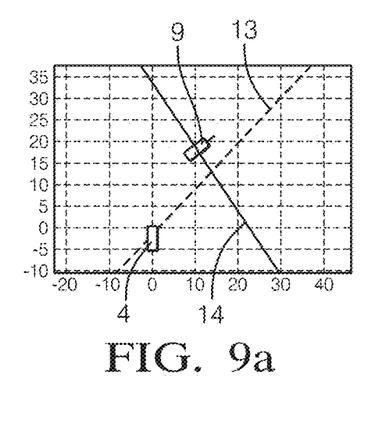
Figure 9B:
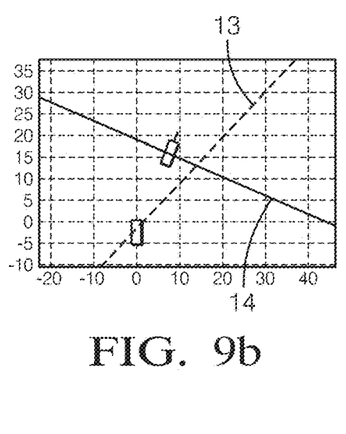
Figure 9C:
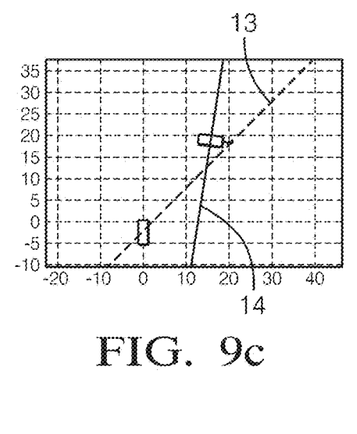
Figure 9D:
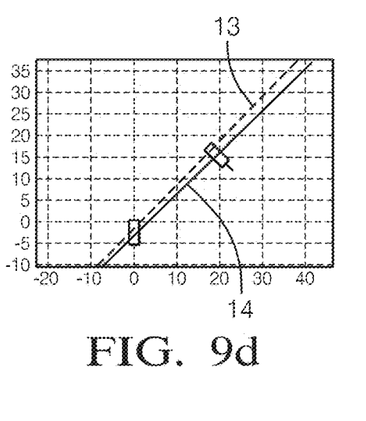

FIG. 8 shows an example of test results of a maneuver which comprised the target 9 driving on a circular track 12. FIG. 9a to d illustrate the movement. The point of intersection of the two lines 13 and 14 (equivalent to lines lCA and lPH respectively) remains roughly at the same position, which is consistent with the actual maneuver performed. The only exception is when the two lines are almost parallel. This confirms analytical results.

Figure 10:
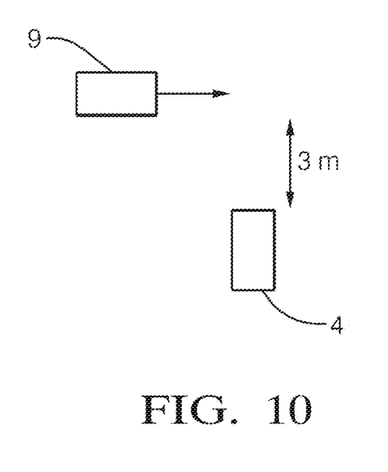
FIG. 10 shows an example of test results of a maneuver.
Figure 11A:
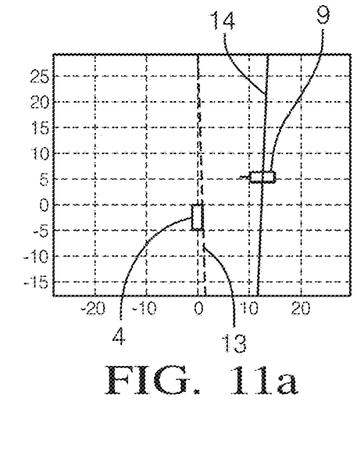
Figure 11B:
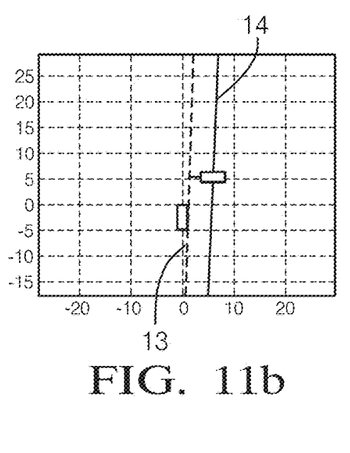
Figure 11C:
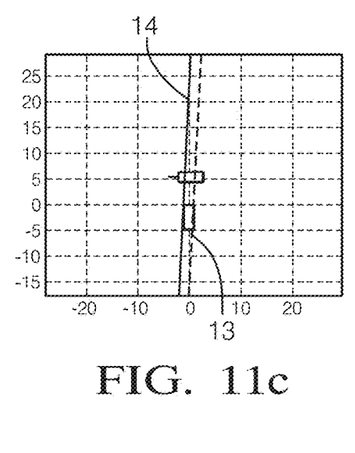
Figure 11D:
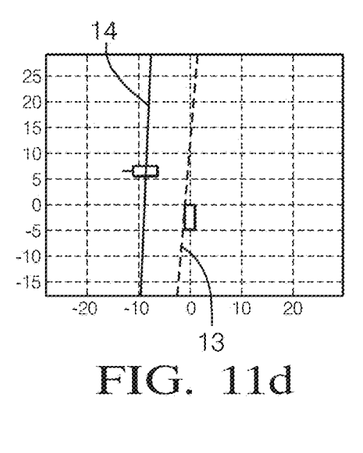

FIG. 10 shows an example of test results of a maneuver where the target 9 is driving straight and FIG. 11a to d illustrates temporal movement. The two lines 13 and 14 remain parallel. This is consistent with the expected behavior, because the target is not yawing.

Figure 12:
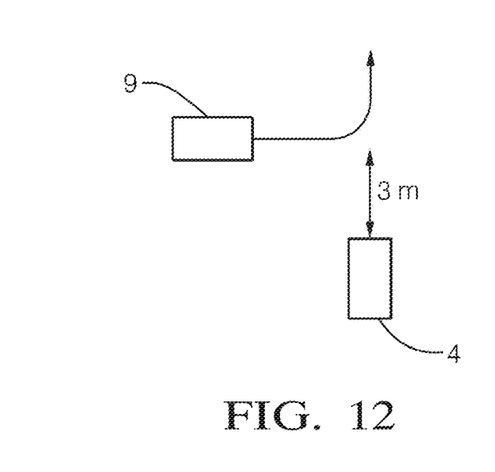
FIG. 12 shows an example of test results of a maneuver.
Figure 13A:
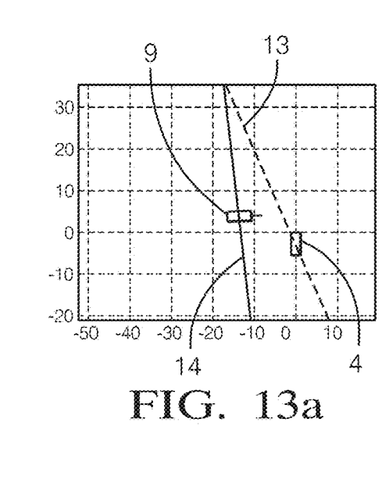
Figure 13B:
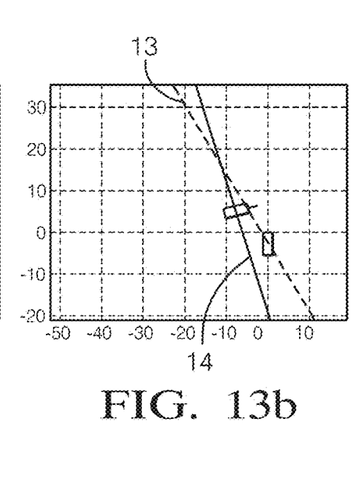
Figure 13C:
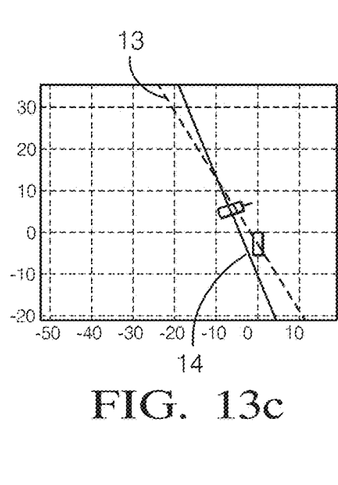
Figure 13D:
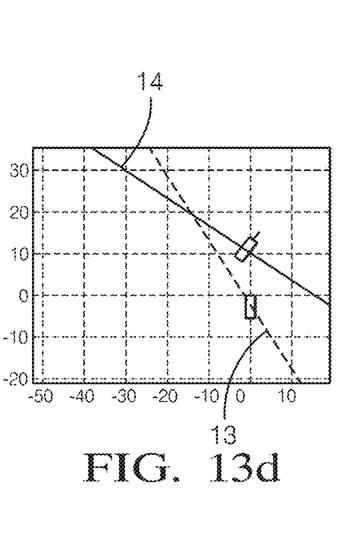

FIG. 12 shows examples of test results of a maneuver where the target is maneuvering at a junction and FIG. 13 a to d illustrate temporal movement. The intersection point changes its position as the yaw rate of the target smoothly changes during the maneuver. This is consistent with expected behavior. Yet again, promising result for junction assist applications.

In the scenario discussed in this document, detections coming from a single sensor are considered. There are different ways detections from multiple sensors can be used when the target is in the common area of their FOVs: each sensor may estimate its own lines resulting from cloud algorithm and orientation estimation In ideal case all lines should intersect at the same point, i.e. the center of rotation. Each sensor can calculate its own center of rotation. These points can then be used to determine resulting estimate for the center of rotation. Such processing should consider plausibility measures for sensor estimate. Detections from all sensors can be collected for improved orientation estimation, but each sensor can calculate a cloud algorithm result based on its own detections.

Using Filtered Heading

Estimation of object orientation usually require more detections than the execution of cloud algorithm. For the purpose of yaw rate estimation/detections, one may consider using target orientation from an associated tracker object. In such a case, yaw rate can be estimated based on only two raw detections. The yaw rate estimation is likely to be more robust, but it will not be an instantaneous result.

Include the Proposed Approach in Object Tracking Filter

If instantaneous estimation is not required, one can consider formulating an object tracking filter. The measurement model of such a filter would then include estimations of yaw rate and center of rotation as proposed in this work.

Propagation of Uncertainty

If the uncertainty of cloud algorithm, as well as uncertainty of orientation is known then uncertainty propagation rules can be used for uncertainty estimation of center of rotation and yaw rate. It can be the most efficient way to determinate if motion estimation is reliable. Estimated uncertainty can be also used in Kalman filter as a level of measurement noise. In its pure form, the approach described here is not based on tracking or filtering and therefore does not require any motion model and no initialization stage is required.

The approach has a lower number of restrictions in comparison to currently known concepts based on Cloud Algorithm. It does not need measurements from several time instances and works for stationary host vehicle. It does not need the target to be in the field of view of two sensors mounted significant distance away from each other. The approach does not require filtering/tracking and does not rely on any target motion model. The algorithm is suitable for application in production embedded systems because of its low computational complexity. The method can be immediately used in state-of-art short range radars for estimation of objects at low range (up to about 15 meters); e.g. it is suitable for junction assist applications (crossroads, roundabouts). The accuracy of the results can only be improved if more detections from moving objects were available; this is likely to happen as sensing technology progresses and in sensors dedicated to Autonomous Driving applications.

What is claimed is:

1. A method of determining, by a host vehicle equipped with a radar system, a yaw rate of a target vehicle in a horizontal plane, the radar system including a radar sensor unit configured to receive signals emitted from the host vehicle and reflected by the target vehicle, the method comprising:
    a) emitting a radar signal and determining, from a plurality of point radar detection measurements obtained by the radar sensor unit, range, azimuth, and range rate values for each point radar detection;
    b) determining, by using a Least Square method and in a sensor coordinate system, Least Square solution values of longitudinal and lateral components of a range rate equation of the target vehicle, where the longitudinal and lateral components of the range rate equation are based on the azimuth and range rate values, a longitudinal velocity of the host vehicle, and a lateral velocity of the host vehicle, an x-axis of the sensor coordinate system being perpendicular to the radar sensor unit and pointing away and ahead of the radar sensor unit, a y-axis of the sensor coordinate system being perpendicular to the x-axis and pointing right of the radar sensor unit;
    c) determining an orientation angle and a center of the target vehicle, the orientation angle being relative to the x-axis and a first line representing an orientation of the target vehicle, the center being based on the range and azimuth values and a second line that is perpendicular to the first line and passes through the center of the target vehicle;
    d) determining a position of a center of rotation of the target vehicle as an intersection point of the second line and a third line, the third line being determined using a position of the radar sensor unit of the host vehicle and the Least Square solution values of the longitudinal and lateral components of the range rate equation;
    e) estimating the yaw rate based on the position of the center of rotation of the target vehicle and the Least Square solution values of the longitudinal and lateral components of the range rate equation; and
    f) operating, by a driving-assistance system of the host vehicle, the host vehicle based on the yaw rate of the target vehicle.

2. The method of claim 1, wherein determining the position of the center of rotation of the target vehicle comprises:
    determining whether the third line and the second line are parallel to one another; and
    responsive to a determination that the third line and the second line are not parallel, determining the intersection point of the third line and second line.

3. The method of claim 2, wherein the method further comprises:
    responsive to a determination that the third line and the second line are parallel, determining the yaw rate of the target vehicle cannot be estimated and that the target vehicle is moving along a straight line.

4. The method of claim 1, wherein the method further comprises estimating the orientation angle using one of an L fit transform, a Hough transform, or a rotating caliper algorithm on the range and azimuth values.

5. The method of claim 1, wherein the plurality of point radar detection measurements is obtained from a single frame of radar data.

6. The method of claim 1, wherein the second line has a slope equal to a negative inverse of a tangent of the orientation angle of the target vehicle and a y-intercept based on the center of the target vehicle and the orientation angle of the target vehicle.

7. The method of claim 6, wherein the third line has a slope equal to the negative quotient of the lateral component and the longitudinal component of the range rate equation and a y-intercept equal to zero.

8. The method of claim 1, wherein the yaw rate is estimated as:
    the longitudinal component of the range rate equation divided by a y-coordinate of the position of the center of rotation of the target vehicle; or
    negative one times the lateral component of the range rate equation divided by an x-coordinate of the position of the center of rotation of the target vehicle.

9. The method of claim 1, wherein the method further comprises:
    determining estimates of longitudinal velocity and lateral velocity of the target vehicle based on the yaw rate and coordinates of the center of rotation of the target.

10. The method of claim 1, wherein the first line passes through the center of the target vehicle.

11. A system of a host vehicle comprising:
    a radar system configured to determine a yaw rate of a target vehicle in a horizontal plane, the radar system configured to:
    a) emit a radar signal and determine, from a plurality of point radar detection measurements obtained by a radar sensor unit of the radar system, range, azimuth, and range rate values for each point radar detection, the radar signal being reflected by the target vehicle;

b) determine, by using a Least Square method and in a sensor coordinate system, Least Square solution values of longitudinal and lateral components of a range rate equation of the target vehicle, where the longitudinal and lateral components of the range rate equation are based on the azimuth and range rate values, a longitudinal velocity of the host vehicle, and a lateral velocity of the host vehicle, an x-axis of the sensor coordinate system being perpendicular to the radar sensor unit and pointing away and ahead of the radar sensor unit, a y-axis of the sensor coordinate system being perpendicular to the x-axis and pointing right of the radar sensor unit;

c) determine an orientation angle and a center of the target vehicle, the orientation angle being relative to the x-axis and a first line representing an orientation of the target vehicle, the center being based on the range and azimuth values and a second line that is perpendicular to the first line and passes through the center of the target vehicle;

d) determine a position of a center of rotation of the target vehicle as an intersection point of the second line and a third line, the third line being determined using a position of the radar sensor unit of the host vehicle and the Least Square solution values of the longitudinal and lateral components of the range rate equation; and e) estimate the yaw rate based on the position of the center of rotation of the target vehicle and the Least Square solution values of the longitudinal and lateral components of the range rate equation; and a driving-assistance system of the host vehicle configured to operate the host vehicle based on the yaw rate of the target vehicle.

12. The system of claim 11, wherein the radar system is further configured to determine the position of the center of rotation of the target vehicle by:

determining whether the third line and the second line are parallel to one another; and responsive to a determination that the third line and the second line are not parallel, determining the intersection point of the third line and second line.

13. The system of claim 12, wherein the radar system is further configured to:

responsive to a determination that the third line and the second line are parallel, determine the yaw rate of the target vehicle cannot be estimated and that the target vehicle is moving along a straight line.

14. The system of claim 11, wherein the radar system is further configured to estimate the orientation angle using one of an L fit transform, a Hough transform, or a rotating caliper algorithm on the range and azimuth values.

15. The system of claim 11, wherein the plurality of point radar detection measurements is obtained from a single frame of radar data.

16. The system of claim 11, wherein the radar system is further configured to determine the second line as having a slope equal to a negative inverse of a tangent of the orientation angle of the target vehicle and a y-intercept being based on the center of the target vehicle and the orientation angle of the target vehicle.

17. The system of claim 16, wherein the radar system is further configured to determine the third line as having a slope equal to the negative quotient of the lateral component and the longitudinal component of the range rate equation and a y-intercept equal to zero.

18. The system of claim 11, wherein the radar system is further configured to estimate the yaw rate as:

the longitudinal component of the range rate equation divided by a y-coordinate of the position of the center of rotation of the target vehicle; or negative one times the lateral component of the range rate equation divided by an x-coordinate of the position of the center of rotation of the target vehicle.

19. The system of claim 11, wherein the radar system is further configured to:

determine estimates of longitudinal velocity and lateral velocity of the target vehicle based on the yaw rate and coordinates of the center of rotation of the target.

20. The system of claim 11, wherein:

the radar system comprises multiple radar sensor units, each radar sensor unit is configured to collect a respective plurality of point radar detection measurements; and the radar system is further configured to:

determine, from each respective plurality of point radar detection measurements and for each radar sensor unit, respective range, azimuth, and range rate values;

determine, for each radar sensor unit, respective Least Square solution values of longitudinal and lateral components of the range rate equation of the target vehicle;

determine, for each radar sensor unit, respective orientation angles of the target vehicle, respective centers of the target vehicle, respective first lines, respective second lines, and respective third lines;

responsive to determinations that the respective third lines and the respective second lines are not parallel, determine respective positions of the center of rotation of the target vehicle; and estimate the yaw rate based on the respective positions of the center of rotation of the target vehicle and the respective Least Square solution values of the longitudinal and lateral components of the range rate equation.

* * * * *